Patented Mar. 7, 1939

2,149,672

UNITED STATES PATENT OFFICE 2,149,672

PROCESS FOR MAKING A PRESS POWDER

Albert Rudolph Frank and Hans Heinrich Franck, Berlin-Charlottenburg, Karl Zieke, Trostberg, and Emil Hey, Berlin, Germany No Drawing. Application September 7, 1937, Serial No. 162,828. In Germany September 8, 1936

1 Claim. (Cl. 260—69)

This invention relates to a process for preparing a pulverulent condensation product from dicyandiamide and formaldehyde which readily fuses in the hot press and rapidly hardens.

The new process consists in this that 1 mol of dicyandiamide is caused to act on 2.75–3.5 mols, preferably 3 mols, of formaldehyde at boiling temperature or temperatures lying thereunder for purpose of alkaline condensation, and polymerisation is effected up to the formation of a clear, leathery jelly or a hydrophobic resin precipitable by means of water. After washing, drying and grinding a powder is obtained which, if desired or necessary after addition of the known filler substances, can be readily pressed to light coloured articles which are extremely resistant towards boiling water.

It has already been proposed to make condensation products from dicyandiamide and formaldehyde by allowing the two components to react upon one another in the proportion of 1:1 or 1:2 at temperatures below boiling point. According to this process, however only hydrophylic resins are obtained, that is to say solutions from which the resin can be obtained only by evaporation, in contradistinction to the process according to the present invention which enables a hydrophobic resin to be directly obtained. In chemical composition also acid condensed resins differ very substantially from those prepared in alkaline medium, since in the presence of acid the dicyandiamide is saponified to dicyandiamidine, which, as a strong base, binds the acid. The acid condensation products therefore always contain considerable quantities of the products of the reaction between formaldehyde and the salts of dicyandiamidine in contradistinction to those prepared according to the present process in which latter no saponification to dicyandiamidine can occur.

It has further been proposed to condense 1 mol of dicyandiamide with 1.0–2.5 mols of formaldehyde at boiling temperature until on cooling the reaction mixture a hydrophobic resin separates out. The resin obtained in this way however is extremely sensitive to hot water, in contradistinction to the product prepared according to the present invention which is very resistant towards hot, and even boiling, water.

It has also already been proposed to carry out the reaction between dicyandiamide and formaldehyde in the presence of substances which split off hydroxyl ions, in order in this way to diminish the water sensitivity of the condensation products. This expedient also does not lead to the desired result.

The close investigation of the reaction between dicyandiamide and formaldehyde has shown that the mol ratio of the components acting upon one another, which in all the processes heretofore described has been accorded only a subordinate role, is of decisive importance for the water stability or water resistance of the condensation products in the case of alkaline condensation. The best results were obtained by using 3 mols of formaldehyde to 1 mol of dicyandiamide. If the quantity of formaldehyde is lowered then the water stability decreases; if it is raised then hydrophylic resins are obtained which can be isolated only by evaporation. The lower limit lies at about 2.75 mols, and the upper at about 3.25 mols, of formaldehyde. The water stability or resistance of the products prepared in this way is, already before the final conversion into the highest degree of polymerisation taking place in the hot press, so large that the little water-sensitive constituents still present can be dissolved out by means of hot water without attacking the bulk of the resin.

It has further been found that, in order to obtain condensation products from formaldehyde and dicyandiamide which are resistant to boiling, it is advisable before drying to dissolve out the small quantities of low polymerised constituents still contained in the jelly mass by treating with hot water, if necessary or desired with addition of sodium sulphite.

Condensation accelerators may be added to the reaction mixture and fillers and colouring matter, fluxing agents and hardening accelerators may be added to the resin in the known manner. The stability may be raised in known manner by addition of fillers, such as wood meal, cellulose, cotton and so forth.

According to the desired purpose of use the flowing capability of the resin so obtained can be readily adjusted by regulating the degree of polymerisation and the water content. It is true it has already been proposed to prepare mixed condensation products from dicyandiamide, phenol and formaldehyde. Here however always other condensation conditions and mixture ratios come into question, and more particularly also the production of hydrophylic resins which have to be obtained first by evaporating down. These resins do not show the favourable properties during their working up which are possessed by the products according to the present invention.

Example 1

168 g. of dicyandiamide (2 mols) are dissolved in 450 ccs. of 40% formalin (6 mols). The solution is boiled under reflux for 2½ hours. On attaining the boiling point the solution automatically becomes alkaline; thereupon polymerisation is effected on a water bath at 80° C. until a clear, leather-like jelly is formed. The jelly is comminuted and left in the drying chamber at 100–110° C. until a specimen of the resin rapidly hardens in the hot press. At the end of this time the whole is finely ground and suspended in water. The excess formaldehyde and the water-sensitive constituents then pass into solution. After filtering off at the pump and washing, the product is dried at room temperature in vacuo. The powder obtained thus can be rapidly pressed in a hot press at about 140° C. to colourless, clear and perfectly water stable articles.

Example 2

504 g. of dicyandiamide (6 mols) are dissolved in 1350 ccs. of 40% formalin (18 mols). After boiling for 3½ hours under reflux 180 g. of cellulose are introduced in the mixture and the mixture polymerised for about 25 hours on a water bath at about 80° C. The further treatment is carried out as in Example 1. Highly transparent or translucent pressed articles are obtained which mechanically are extremely stable.

What we claim is:

A process for producing a press powder consisting in boiling a mixture of dicyandiamide and a 40% solution of formalin under reflux for about three hours, the proportion of the reactants being 1 mol of dicyandiamide and 2.75 to 3.25 mols of formaldehyde, then effecting polymerisation on a water bath at 80° C., to form a jelly, comminuting the jelly, drying said comminuted jelly at 100 to 110° C., grinding the dried jelly, suspending the finely ground jelly in water, filtering off the water, washing the product and finally drying the product at room temperature in vacuo.

ALBERT RUDOLPH FRANK.
HANS HEINRICH FRANCK.
KARL ZIEKE.
EMIL HEY.